No. 649,836. Patented May 15, 1900.
W. G. HALFORD.
MILK COOLER.
(Application filed Mar. 29, 1899.)

(No Model.)

Witnesses
W. G. Halford, Inventor
By his Attorneys,

UNITED STATES PATENT OFFICE.

WILLIAM G. HALFORD, OF GRANBURY, TEXAS.

MILK-COOLER.

SPECIFICATION forming part of Letters Patent No. 649,836, dated May 15, 1900.

Application filed March 29, 1899. Serial No. 710,992. (No model.)

*To all whom it may concern:*

Be it known that I, WILLIAM G. HALFORD, a citizen of the United States, residing at Granbury, in the county of Hood and State of Texas, have invented a new and useful Combined Water-Cooler and Refrigerator, of which the following is a specification.

The invention relates to a combined water-cooler and refrigerator.

One object of the present invention is to improve the construction of devices of this character and to provide a simple, inexpensive, and efficient one capable of enabling the temperature of its contents to be readily controlled and quickly changed.

A further object of the invention is to provide a combined water-cooler and refrigerator which may be conveniently employed as a churn-body when desired.

The invention consists in the construction and novel combination and arrangement of parts, hereinafter fully described, illustrated in the accompanying drawings, and pointed out in the claims hereto appended.

Figure 1:
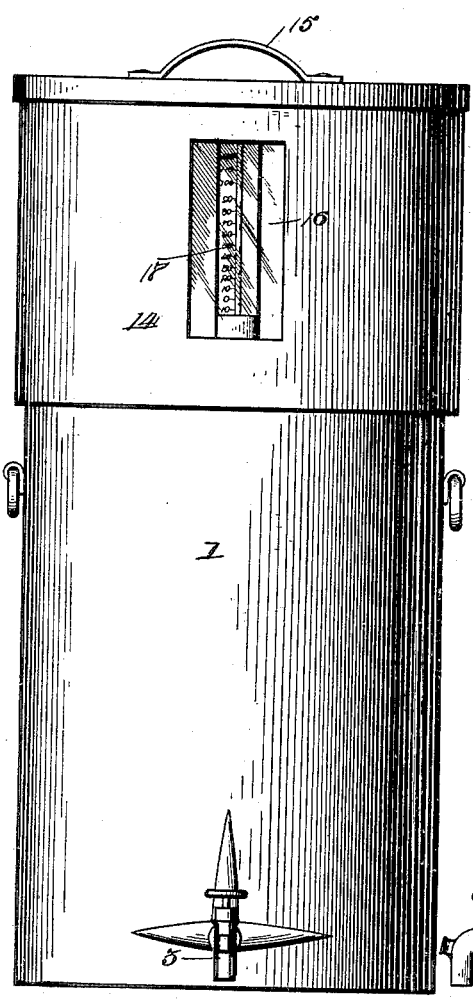
Figure 2:
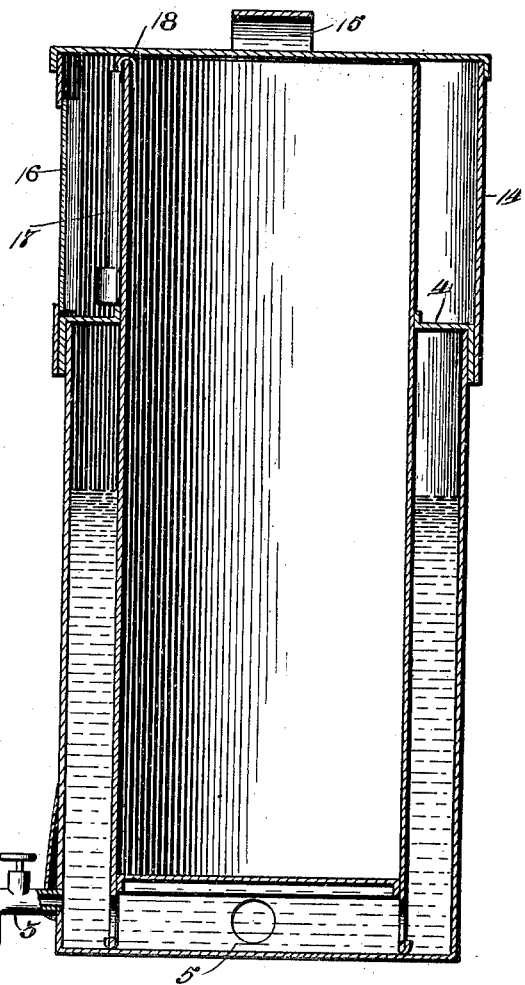

In the drawings, Figure 1 is a side elevation of a combined water-cooler and refrigerator constructed in accordance with this invention. Fig. 2 is a vertical sectional view of the same.

Like numerals of reference designate corresponding parts in both figures of the drawings.

1 designates an outer cylindrical receptacle constructed of suitable material and receiving a cylindrical inner vessel 2 of less diameter than the outer vessel to provide an intervening space for the reception of water for raising or lowering the contents of the inner vessel, which may be conveniently employed as a churn-body when the device is not in use as a refrigerator or water-cooler. The outer receptacle is provided at opposite sides with suitable receptacles, and it has a faucet 3 arranged near its bottom for drawing off the water. The inner vessel 2, which extends a considerable distance above the outer vessel, is provided at its bottom with a depending annular flange 5, having perforations or openings to permit a circulation of water and supporting the bottom of the inner vessel above that of the outer vessel. By this construction the water in the intervening space between the inner and outer vessels is permitted to circulate freely around the inner vessel. The outer vessel is closed by a cover or lid 4, consisting of an annular flange or ring L-shaped in cross-section and soldered or otherwise secured to the inner vessel at a point between the ends thereof, as clearly illustrated in Fig. 2 of the accompanying drawings. This annular flange or lid 4 is provided with a filling-opening 8 to permit water to be introduced into the space surrounding the inner vessel, and by the construction shown the contents of such space may be readily drawn off when desired. The inner vessel is closed by a cap or cover 14, which is provided at its top with a handle 15 and which has a depending flange extending downward to and fitting over the flange or cover 4 of the inner vessel. The depending flange of the cap or cover 14 has a transparent plate or pane 16, of isinglass or other suitable material, and is of substantially the same diameter as the outer receptacle in order to provide an intervening space between the upper projecting portion of the inner vessel and the said cap or cover. Within the upper and inner space is arranged a thermometer 17, disposed opposite the transparent plate or pane 16, in order that the temperature of the interior of the device may be read without removing the cap or cover. The thermometer is provided at its top with a hook 18, consisting, preferably, of an extension of the graduated plate upon which the thermometer-tube is mounted and engaging the upper edge of the inner vessel. The thermometer is retained in position by the cap or cover 14, which is adapted to engage the hook 18 and hold the same on the upper edge of the inner vessel.

The intervening space between the inner and outer vessels or receptacles may be filled with cold water or with ice and water to afford a supply of cold water for drinking purposes and also to maintain the contents of the inner vessel at low temperature; but the structure is especially adapted when not in use as a water-cooler and refrigerator to be employed as a churn-body, as the temperature of the contents of the inner receptacle may be readily controlled and quickly changed by the introduction of water of different temperatures into the intervening space between the inner and outer receptacles, and this will greatly assist the operation of churning and enable butter to be rapidly produced. When used as a churn, any suitable dasher mechanism may be provided, the cap or cover 14 being of course removed when the inner vessel is used as a churn-body.

It will be seen that the device is simple and comparatively inexpensive in construction, that it provides an efficient water-cooler and refrigerator, and that it may be advantageously employed as a churn-body.

What is claimed is—

1. A device of the class described comprising an outer receptacle, a removable inner receptacle of less diameter than the outer receptacle whose walls extend a considerable distance above the same, providing a space for the reception of a thermometer and having at a point between its ends, a rigid flange forming a cover for the outer receptacle, and a cover closing the inner receptacle and having an outer depending flange extending downward below the upper edges of the outer receptacle and provided with a transparent plate, substantially as described.

2. A device of the class described comprising an outer receptacle, a removable inner receptacle of less diameter than the outer receptacle extending a considerable distance above the same and provided at a point between its ends with a rigid flange forming a cover for the outer receptacle, and a cap closing the inner receptacle and fitting on the said flange, substantially as described.

In testimony that I claim the foregoing as my own I have hereto affixed my signature in the presence of two witnesses.

WILLIAM G. HALFORD.

Witnesses:
  A. CARMICHAEL,
  LAN MORRIS.